Jan. 22, 1957 P. J. GUNAS 2,778,251
MITER DRILL JIG
Filed Nov. 15, 1954
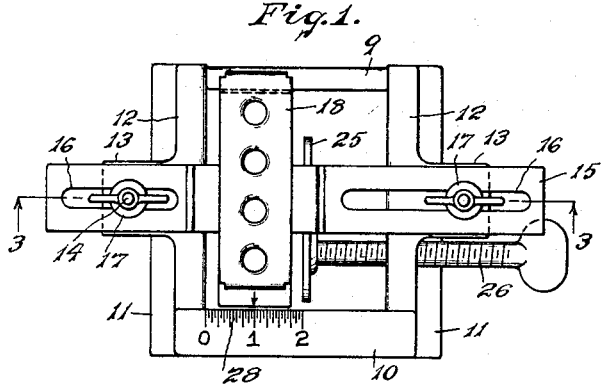
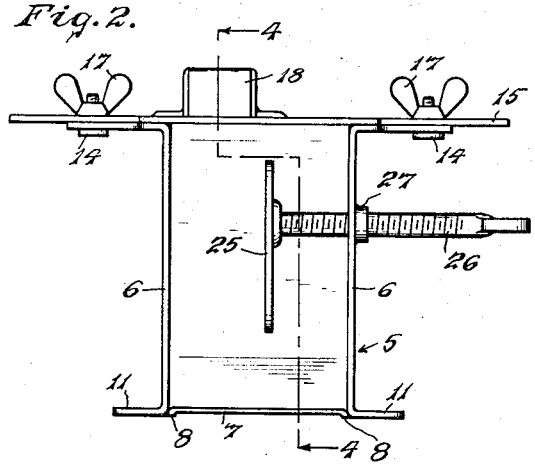
INVENTOR.
PETER J. GUNAS.
BY
*Louis V. Lucia*
ATTOREY.

United States Patent Office 2,778,251
Patented Jan. 22, 1957

2,778,251

MITER DRILL JIG

Peter J. Gunas, Manchester, Conn.

Application November 15, 1954, Serial No. 468,651

2 Claims. (Cl. 77—62)

This invention relates to a miter drill jig and more particularly to a device for accurately positioning and guiding a drill when drilling holes for the reception of dowels in the mitered end portion of a frame member or the like.

It is an object of this invention to provide a jig which is adapted to receive the mitered end portion of a member and which can be adjusted so that the dowel holes may be accurately drilled into said portion to match with corresponding holes drilled into the mitered portion of a separate member.

A further object of this invention is to provide such a jig which may be constructed of sheet metal and which is durable and economical to manufacture.

Further objects and advantages of this invention will be more clearly understood from the following description and from the drawings in which:

Fig. 1 is a plan view of a drill jig embodying the present invention.

Fig. 2 is a front view of said jig.

Fig. 3 is a fragmentary front view of said jig taken on line 3—3 of Fig. 1.

Fig. 4 is a sectional side view on line 4—4 of Fig. 2.

Fig. 5 is an isometric view of the drill guide used in said jig.

As shown in the drawings, my improved drill jig includes a base 5 which comprises side members 6—6 and a bottom plate 7 that is angularly disposed therebetween, preferably at an angle of 45°, and has side flanges 8—8 that are secured to the said side members. The said bottom plate 7 also has an inwardly turned flange 9 at its upper end providing a transverse guide edge above the tops of the side members at the rear of the base. A tie bar 10 is secured to the tops of said side members and provides a cooperating guide edge at the front of the base for a purpose to be hereinafter described.

The said side members 6—6 have outwardly extending flanges 11—11 forming feet, by means of which the jig may be fastened to a supporting surface when desired, and each of the side members has an outwardly extending flange 12 at its upper end and to the top surface of which one end of the tie bar 10 is secured. Oppositely disposed projections 13—13 extend laterally from the flanges 12—12 and each of said projections contains an anchoring screw 14.

A slide bar 15 is slidably mounted upon the flanges 12—12 and the projections 13—13 and has elongated slots 16—16 which receive the screws 14—14. Wing nuts 17—17 are provided upon said screws for adjustably securing the slide bar 15 in position upon the base. Said slide bar has thereon an integral box-like guide portion 18 with a series of aligned guide holes in the top thereof for guiding a drill 20 as shown in dotted lines in Fig. 4. Each of said holes 19 is surrounded by a guide sleeve 21 which extends downwardly from the top of the portion 18.

A guide plate 22 is secured by spot welding or otherwise, to the bottom of the member 18 and is slidably disposed between the opposed edges of the flange 9 and the tie bar 10 and by means of which the portion 18 is guided for straight line lateral movement on the base 5. Said guide plate has holes 23 therethrough which are aligned with the holes 19 and the sleeves 21 to further guide the drill 20.

To secure a workpiece, as shown in dotted lines at 24 in the jig, there is provided a clamping plate 25 that is secured to the end of a clamping screw 26 which is threaded to a collar 27 that projects outwardly from one of the side members 6.

In order to locate the guide holes 19 over the center of the workpiece clamped between the plate 25 and the opposite side member 6, there is provided on the tie bar 10 a suitable centering scale 28 which designates in inches the thickness of the workpiece, but is actually one-half actual size.

In the use of my improved drill jig, the mitered workpiece 24 is placed edgewise upon the bottom plate 7 and between the clamping plate 25 and the opposite side member 6. Said workpiece is moved upwardly until the mitered edge thereof abuts the stop 9 and is then clamped in position against the side member 6 by rotating the clamping screw 26. The drill guide 18 is then shifted laterally with respect to the mitered face of the workpiece and the holes 19 are located over the center thereof by placing the indicator arrow 29 on the plate 22 opposite the mark on the scale 28 which indicates the thickness of the workpiece. Since said scale is one-half actual size, it will be understood that the axes of the holes 19 will then be disposed over the center of the mitered face of the workpiece. The dowel holes may then be drilled by passing the drill downwardly through the holes 19 and 23 and into the workpiece 24 to the desired depth.

When the workpiece is removed from the jig, the setting of the member 18 is not disturbed so that dowel holes drilled in the next workpiece will coincide with those previously drilled when the mitered workpieces are joined together.

I claim:

1. A drill jig for use in drilling dowel holes in mitered portions including a base comprising a pair of oppositely disposed side members and an intermediate bottom plate connecting said side members and disposed angularly thereto, the said side members having outwardly extending flanges along their upper edges, a drill guide member slidable upon said flanges transversely to the base and adjustably secured to said base, the said bottom plate having a flange thereon projecting inwardly above the flanges on said side members, a tie bar secured to said outwardly extending flanges opposite to the flange on said bottom plate, and a plate secured to said drill guide member and slidable between said tie bar and flange on the bottom plate.

2. A drill jig for use in drilling dowel holes in mitered portions including a base comprising two side members and an intermediate bottom plate disposed angularly between said side members, the said side members having means on their bottom edges providing feet for said base and outwardly extending flanges along their top edges with projections extending laterally therefrom at opposite sides of the base; the said bottom plate having an inwardly extending flange disposed above the tops of the side members, a tie bar secured to the flanges at the tops of the side members and located opposite to the flange on the bottom plate, a guide bar slidable upon said top flanges transversely to the base and having drill guide means thereon, the said guide bar having elongated slots therein, fastening means on said projections extending through said slots and adjustably securing the said guide bar to the projections on the upper flanges, a guide plate secured to the bottom of the guide bar and slidable between the guide flange and said tie bar, the said plate and guide member having coaxial holes therein for guiding a drill perpendicularly to the mitered portion being drilled, a clamping plate between said side members, and a clamping screw threaded to one of the said side members and secured to said clamping plate for clamping a workpiece between the clamping plate and the opposite side member.

References Cited in the file of this patent

UNITED STATES PATENTS

| | | |
|---|---|---|
| 1,161,479 | Kelley | Nov. 23, 1915 |
| 1,269,811 | Heritage | June 18, 1918 |
| 2,260,784 | Morton | Oct. 28, 1941 |